United States Patent [19]
Ofer et al.

[11] Patent Number: 5,903,913
[45] Date of Patent: May 11, 1999

[54] METHOD AND APPARATUS FOR STORAGE SYSTEM MANAGEMENT IN A MULTI-HOST ENVIRONMENT

[75] Inventors: Erez Ofer, Brookline; Kenneth A. Halligan, Leominster, both of Mass.

[73] Assignee: EMC Corporation, Hopkinton, Mass.

[21] Appl. No.: 08/770,348

[22] Filed: Dec. 20, 1996

[51] Int. Cl.$^6$ .................................................. G06F 13/10
[52] U.S. Cl. .......................... 711/156; 711/147; 711/112
[58] Field of Search ................................... 711/112, 113, 711/118, 130, 147, 156

[56] References Cited

U.S. PATENT DOCUMENTS 5,642,495  6/1997  Ammann et al. ..................... 711/153

*Primary Examiner*—Eddie P. Chan
*Assistant Examiner*—Kevin L. Ellis
*Attorney, Agent, or Firm*—John M. Gunther, Esq.; Leanne J. Fitzgerald, Esq.

[57] ABSTRACT

A method of managing a storage system is provided which allows each host of connected to a storage system supporting multiple hosts to view the identification information assigned to the storage devices by the respective hosts. The method includes providing a command which allows a host to write identification information to an area on the disk drives controlled by the host which was previously reserved for use by the storage system. In addition to writing the data to the physical storage device, execution of the command also causes the identification information to be written to an area in global memory which holds information about each of the storage devices in the storage system. Since the information is stored in a global memory, each host my access the information. Using a second command provided, any host may read the information in global memory and thus learn the identification assigned by other hosts. This allows a maintenance utility run on one host to create a cross reference between storage system identifications assigned to the disk drives and host system identifications assigned to the disk drives.

7 Claims, 3 Drawing Sheets

METHOD AND APPARATUS FOR STORAGE SYSTEM MANAGEMENT IN A MULTI-HOST ENVIRONMENT

BACKGROUND OF THE INVENTION

This invention relates generally to storage systems associated with computer systems and more particularly to providing a method and apparatus for improving the monitoring and control arrays of disks associated with the storage systems.

As it is known in the art, computer systems generally include a central processing unit, a memory subsystem and a storage subsystem. According to a networked or enterprise model of a computer system, the storage subsystem associated with or in addition to a local computer system, may include a large number of independent storage devices or disks housed in a single enclosure. This array of storage devices is typically connected to several computers over a network. Such a model allows for the centralization of data which is to be shared among many users and also allows a single point of maintenance for the storage functions associated with computer systems.

One type of storage subsystem known in the art is one which includes a number of redundant disk storage devices configured as an array. Such a system is typically known as a RAID storage system. One of the advantages of a RAID type storage system is that it provides a massive amount of storage (typically in the tens to hundreds of gigabytes range) and depending upon the RAID configuration may provide several differing levels of fault tolerance.

A disk storage system such as the RAID system described above is a much more complex system compared to a so called JBOD (Just a Bunch of Disks) system and will typically include one or more front end (or host) adapters/controllers which are responsible for receiving and processing requests from the various host devices which may be connected to the storage system. Additionally, a RAID storage system as described above may also include several disk adapters/controllers which are used to control the transactions between the disk storage devices and the host controller/adapter described above. Some storage systems may also include a very large buffer (e.g. a cache memory) for buffering the data transfers between the disk adapters and the host adapters.

The RAID storage systems described above are very complex. Despite the complexity, a system administrator must be able to monitor and control the various devices of the storage system. One way of providing monitoring and control functions is by way of an external (to the storage system) application program running on a host computer. Such programs may include a graphical user interface (GUI) which provides the administrator with an easier way to monitor and manage the storage devices.

Since the type of storage system described above is capable of storing extremely large amounts of data, it will typically be connected to several host computers. Each of the host computers may operate independently of the others. Furthermore, each host connected to the storage system will typically have its own set of private devices or volumes assigned to it which are a subset of all the devices in the storage system. Additionally, each of the hosts will also typically assign labels to its associated devices and volumes using a nomenclature which allows the host operating system to communicate with the devices using standard syntax or naming conventions.

As stated above, the hosts attached to the storage system operate independently. Typically, this results in the devices assigned to one host not being accessible by the other hosts. Although certain storage systems like the SYMMETRIX system manufactured by EMC Corporation allow access to all the disks from a single host during maintenance procedures, the identification of the disks is typically by disk number and is not known by the operating systems of the various hosts. As a result, prior art monitoring and control programs running on one host will not allow a system administrator to find a problematic disk drive based on information supplied by the host system since the host system identification and the internal storage system identification do not coincide.

It would be advantageous, therefore, to provide a storage management system and method which provided a user from one host to be able to identify the disks and or volumes associated with another host using the host designated identification.

SUMMARY OF THE INVENTION

In accordance with the present invention, a storage management method is provided. The method includes providing set of commands which allow host systems attached to the storage device to read and write to storage device locations which were previously reserved for maintenance purposes. The new write command, issued by a host, will be interpreted by the storage system as a specialized command which cause identification information, assigned by the host, to be written to a maintenance area of the storage device (i.e. disk). Additionally, the write command causes the identification information to be written to an area in global memory used to store information about each storage device associated with the storage system. The global memory is an area of memory shared by all host system interface adapters included in the storage system. By placing the identification information in global memory, each host may have access to the information. With such an arrangement, a management utility may create a cross reference table between the storage system specific identifications assigned to the storage devices, and the host system assigned identification information. This cross reference table may then be used to locate storage devices when specified using either host system identification or storage system identification. Such a method results in a reduction in maintenance time for errors reported using host system identification.

BRIEF DESCRIPTION OF THE DRAWINGS

The above and further advantages of the present invention may be better understood by referring to the following description taken into conjunction with the accompanying drawings in which.

DETAILED DESCRIPTION OF THE PREFERRED EMBODIMENTS

Figure 1:
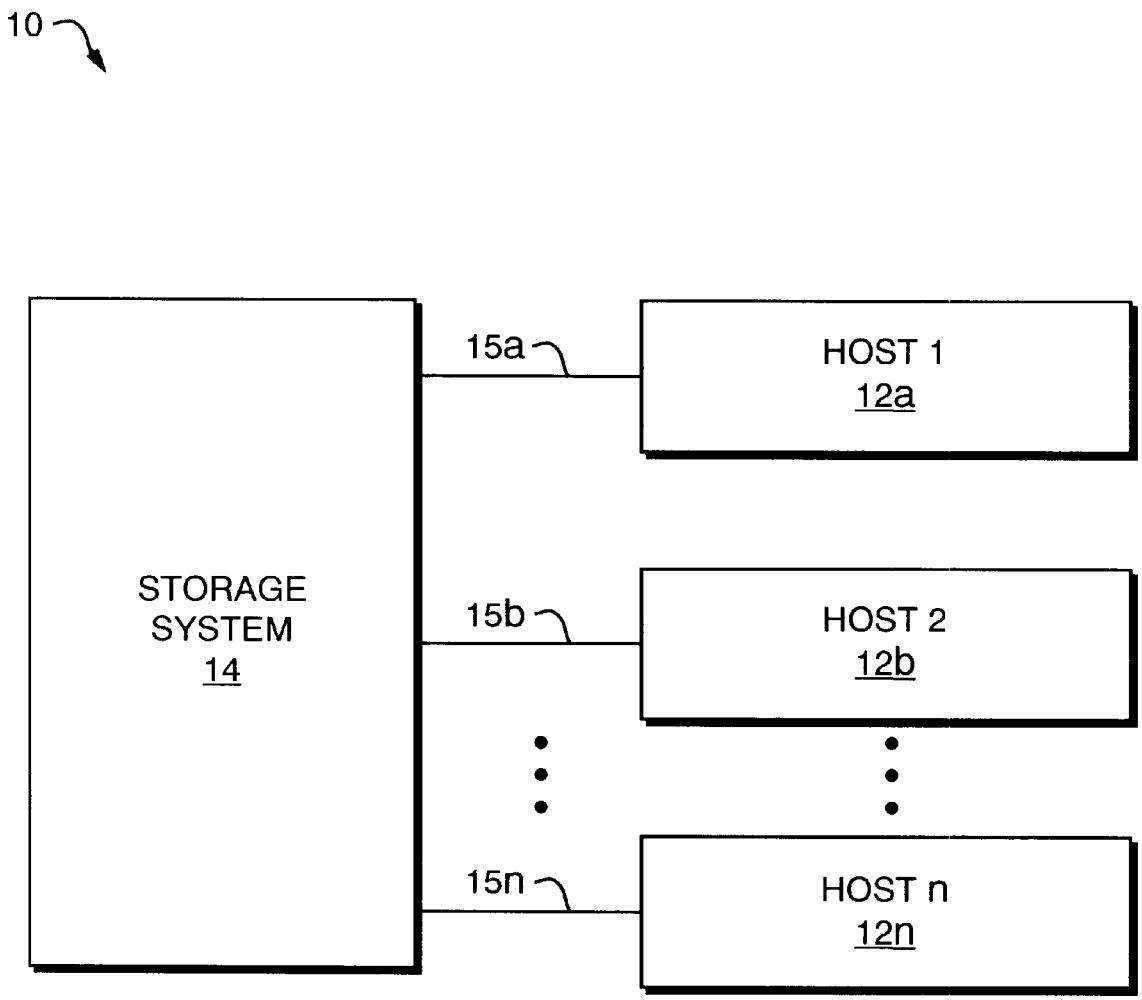
FIG. 1 is a block diagram representation a computer system where one storage system supports multiple host systems.

Referring now to FIG. 1, network computer system 10 is shown to include, in addition to other components not shown, host computers 12a though 12n coupled to storage system 14 via buses 15a–15n respectively. Computers 12a through 12n may be any one of several well known types of computers such as servers or workstations or mainframes. Here, the generic term "host" will be used to identify any computer connected to the storage system 14.

As will be described in more detail below, storage system 14 may include several individual storage devices such as magnetic disks. The disks are generally coupled to controller cards and some type of buffer or cache memory. The disks, controller cards, and cache are generally housed within a single enclosure. For purposes of discussion, the preferred embodiment will be described according to the notion that the storage devices included within storage system 14 are magnetic disks. It should be noted however that the storage devices could be any storage medium which allows storage and retrieval of data (for example, random access memory or magnetic tape or optical disks) and thus the description with respect to magnetic disks should not be seen as a limitation of the present invention.

Figure 2:
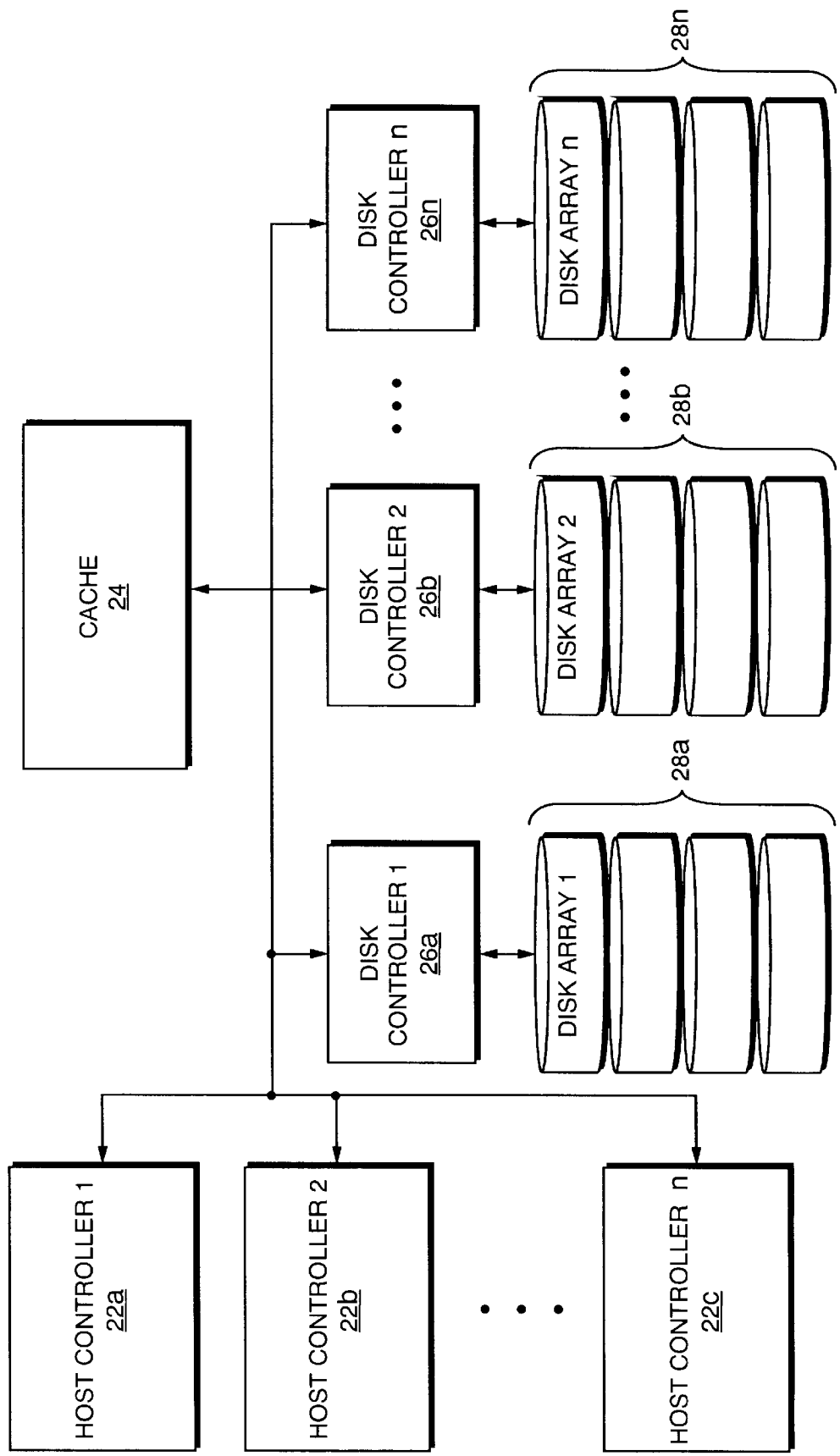
FIG. 2 is a diagrammatic representation of the disk storage subsystem of the computer system of FIG. 1.

Referring now to FIG. 2, storage system 14 of FIG. 1 is shown in more detail to include, among other things, a plurality of bus or host controllers 22a–22n coupled to a buffer or cache 24 via communications path 23. The communications path 23 is further coupled to a plurality of disk controllers 26a through 26n. According to the preferred embodiment of the present invention, communications path 23 may be a plurality of separate buses (not shown). Accordingly, controllers 22a–22n may each be coupled to every bus of communications path 23 or may be selectively coupled to one or more buses which make up communications path 23.

Also according to a preferred embodiment of the present invention, cache 24 is coupled to all buses making up communications path 23 and as such is accessible by all controllers of storage system 14. Cache 24 may be used to, among other things, temporarily store data which is read from the disks of the disk arrays 28a–28n. Alternatively cache 24 may be used to temporarily store data which is received from one of the hosts 12a –12n (FIG. 1) before it is written to the appropriate disk device.

Each of the disk controllers 26a–26n is further coupled to disk arrays 28a through 28n respectively. Storage system 14 communicates or transfers data to and from requesting devices via bus buses 15a–15n (FIG. 1). A request by one of the hosts 12a –12n connected to storage system 14 will be received by one of the bus controllers 22a–22n and, will provide the appropriate request to the individual disk controller or disk controllers corresponding to the storage devices which contain the data to be read or are the target device of data to be written.

Each host 12a –12n will typically have exclusive access to at least one of the drives within the storage system. Each of the host systems may assign their corresponding disk drives with identifications which are unique to the host system. This may occur even if two hosts are running the same operating system (e.g. the UNIX operating system). Using the UNIX operating system as an example, a disk device of storage system 14 might be addressed using the following naming convention: $c_n t_n d_n s_n$. Here $c_n$ identifies the controller which is associated with the particular disk; $t_n$ is the target identification of a particular disk; $d_n$ is the logical unit number of a particular disk; and $s_n$ is the identification of a particular partition within a particular disk. The host system users thus know the storage devices associated with their systems by the $c_n t_n d_n s_n$ naming convention and no other. Therefore, when an error occurs with one of the devices associated with a particular host, the host system administrator would report any such error using the $c_n t_n d_n s_n$ naming convention.

In addition, host system users may run so called volume managers to make it easier for the user to address and identify where information is stored in the storage system. The volume managers are programs which allow a host user to take a set of disks in the storage system and assign them to a volume group. The volume group is made up of logical volumes (or partitions of the physical disks in the volume group). The host user would then store data to the storage system using an identification such as lvol1 or lvol2 indicating that the data is destined for logical volume 1 or logical volume 2. As can readily be seen, the volume managers add another layer of identification over the operating system identification thus further obscuring the actual identification of the device from the host user.

The result of the two levels of identification is that error reports by a host user or administrator will reference the problematic device by the volume name or the operating system name. As described earlier, this information does not give a service technician enough information to readily identify the faulty device. Even if the service technician has storage management software to give visibility to all the devices in the storage system, the software will reference the devices by the basic identification assigned by the storage system manufacturer.

According to the present invention, a method of "branding" or "stamping" disk devices (or physical volumes) within a storage system is provided. As will be described in detail below, the stamp is placed on the disk in an area which is traditionally reserved for maintenance purposes. The stamp is a collection of information and includes the identification given by the host to the physical volume on which it is placed. That is, using the UNIX example from above, the host system places identification of the physical volume in the maintenance cylinders of its assigned drives. According to a preferred embodiment of the present invention, the information stored in the stamp area of the volume includes Host type, Host name, Device name (as given by the host, i.e. the $c_n t_n d_n s_n$ identification), Volume group, and Logical volume. As will also be discussed in detail below, the stamp information is also maintained in a global memory, which is resident within the storage system 14. By maintaining the stamp information in global memory, every host system 12a –12n (FIG. 1) connected to the storage system has the ability to access the stamp information. According to the preferred embodiment, the global memory may include the storage system cache memory.

With the stamp information, a storage management utility (e.g. an application program) need only address each device by the storage system manufacturer's identification and then read the information in the stamp location. According to the preferred embodiment, the hosts read the hidden information using specialized commands. For the UNIX systems described above, the commands are the small systems computer interface (SCSI) read buffer and write buffer commands. Until the present invention, these commands were used mainly for reading information in a buffer associated with a particular disk drive. Here, the commands are used to actually read data from and write data to the storage media. After reading the stamp information from the maintenance area on the disk, the management utility may then create a cross reference table which provides a way of translating host identification information to storage system identification. The management utility may then present the information about all the drives in a storage system using either identification scheme. Thus, an error report which references a physical volume by host given identification may be easily identified by the service technician running the maintenance utility.

Figure 3:
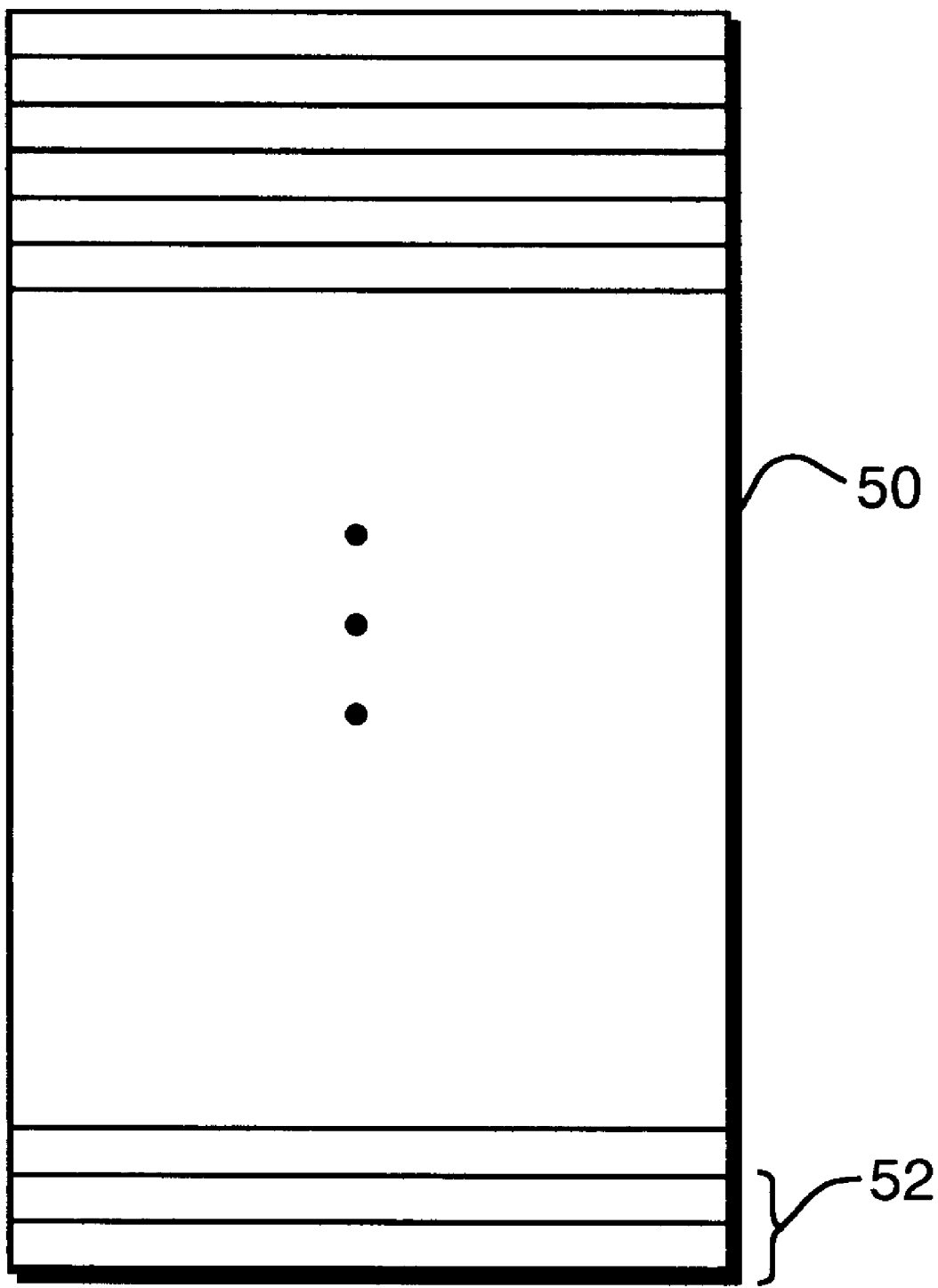
FIG. 3 is a diagrammatic representation of one physical storage volume included in the storage subsystem of FIG. 2.

The details of the storage of stamp information on the physical volumes will now be discussed with reference to FIG. 3 which illustrates a physical storage volume 50 and is shown to include a plurality of cylinders. According to the preferred embodiment of the present invention, two of the cylinders 52 of volume 50 are used to store maintenance information as described above. Here, each cylinder is comprised of fifteen tracks. Out of these maintenance cylinders, an area is reserved for storage of the host stamp information. The amount of storage reserved in the preferred embodiment is 8 k bytes. Although the preferred embodiment reserves 8 k bytes of storage for the host stamp information, here only 512 bytes are used.

The read and write buffer commands used in the preferred embodiment of the present invention are ten byte commands of the following form:

| Read-Buffer | | Write-Buffer | | |
| --- | --- | --- | --- | --- |
| Byte | Value | Byte | Value | Meaning |
| 0 | 3C | 0 | 3B | Operation Code (Op-code) |
| 1 | 01 | 1 | 01 | Vendor unique (allows stamp func.) |
| 2 | CE | 2 | CE | Code for Maintenance Cyl. Access |
| 3 | 01 | 3 | 01 | Buffer Offset |
| 4 | NN | 4 | NN | Buffer Offset continued |
| 5 | NN | 5 | NN | Buffer Offset continued |
| 6 | CC | 6 | CC | Count |
| 7 | CC | 7 | CC | Count continued |
| 8 | CC | 8 | CC | Count continued |
| 9 | 00 | 9 | 00 | N/A |

Here, byte 0 specifies the opcode for either the read or write command. Byte 1, is a vendor unique code which is specified by the storage system manufacturer. This code, when received by the operating system of the storage system of the present invention, allows the host to perform the read and write buffer commands as specified herein. That is, the code (here 01) at byte 1, allows the host to use the read and write buffer commands to place the host stamp information on the storage media. The remaining byte codes specify an offset address into the buffer as to where the data should be stored (or read from) and a count, in multiples of 512 bytes, of how much data to write (or read). Thus, according to the present invention, the operating system (microcode) of the storage system has been enhanced to allow the host system to issue a command that provides access to an area of storage traditionally reserved for use by the storage system itself.

As mentioned earlier, in order for each host system 12a–12n connected to the storage system 14 to have access the host stamp information for all the storage devices within the storage system 14, the stamp information must be kept in a global memory. Here global memory is used to refer to the storage system supplied memory which is accessible by all hosts. However, the global memory could be any memory resident anywhere which provides a storage area accessible to all the hosts. According to the preferred embodiment each storage device in storage system 14 has an associated device table which is a data structure used to store information about the storage device. Also according to the preferred embodiment, the device table for the storage systems are here maintained in the global memory. By storing the device tables in global memory each host is assured access to the information about every device in the storage system.

When the storage system 14 of the present invention receives a write buffer command from a host system (as may be done with a "host stamp" utility), it will recognize the code in byte 1 of the command and take the information described above and store it in a header field of the shared device table. Similarly, when a host system issues a read buffer command (as may be done by storage management utility), the storage system will recognize the command and retrieve the information from the header field of the device table stored in global memory. The device table information is information which is not flushed from global memory (absent a power cycle of the storage system) and as such provides constant visibility as to the host identifications assigned by each host. Should a power cycle occur, the host would simply run the stamp utility to re-establish the identification information in global memory or the information could be retrieved from the physical volumes on which it is permanently stored.

Thus, as can readily be appreciated by one of skill in the art, the provision of a stamping process, using a command previously unavailable to the host systems connected to a storage system, allows a maintenance utility to provide more comprehensive information about the storage devices within the storage system. This relieves the maintenance technician from having to determine the cross reference between storage system IDs and host system IDs and results if faster response to maintenance requests by a host user or administrator.

Having described a preferred embodiment of the present invention, it will now become apparent to those of skill in the art that other embodiments incorporating its concepts may be provided. It is felt therefore that this invention should not be limited to the disclosed embodiment but rather should be limited only by the spirit and scope of the appended claims.

What is claimed is:

1. A method for managing a storage system coupled to a plurality of host computers where each of said plurality of host computers maintains a custom identification for all storage devices assigned thereto, and where each of said plurality of host computers operates independently of the other, said method comprising the steps of:

providing a first command allowing said plurality of host computers to write data to previously inaccessible storage locations within said storage system;

providing a second command allowing said plurality of host computers to read data which has been written to said previously inaccessible storage locations using said first command;

writing by a host computer, using said first command, identification information created by said host computer and corresponding to storage devices associated with the host computer to each of said storage devices associated with said host computer;

reading by another one of said plurality of host computers, using said second command, said identification information;

constructing a cross reference table between said identification information read in said reading step and storage system identification information assigned to said storage devices by said storage system.

2. The method of claim 1 wherein said writing step includes storing said identification information on said storage device in an area reserved for access by said storage system.

3. The storage system of claim 1 wherein said shared memory includes a device table entry for each of said plurality of storage devices and wherein said identification information is stored in a device table associated with said one storage device.

4. The method of claim 1 wherein said writing step includes storing said identification information in a global memory accessible by each of said host computer systems.

5. The method of claim 4 further including the step of:
displaying said read identification information on a display of said other host computer.

6. A storage system capable of being coupled to a plurality of host computers comprising:
a plurality of storage devices;
a shared memory accessible by each of said host computers;
at least one host controller, said host controller further including:
a command processor responsive to receipt of a write buffer command from one of said host computers for writing identification information to a privileged area of one of said plurality of storage devices, said identification information including an identification, assigned by said one host computer, of said storage device,
said command processor further responsive to receipt of said write buffer command for writing said identification information to said shared memory.

7. The storage system of claim 6 wherein said command processor is responsive to receipt of a read buffer command by any one of said host computers for retrieving said identification information from said shared memory.

* * * * *